A. REAGAN.
HARROWS.
No. 193,778. Patented July 31, 1877.
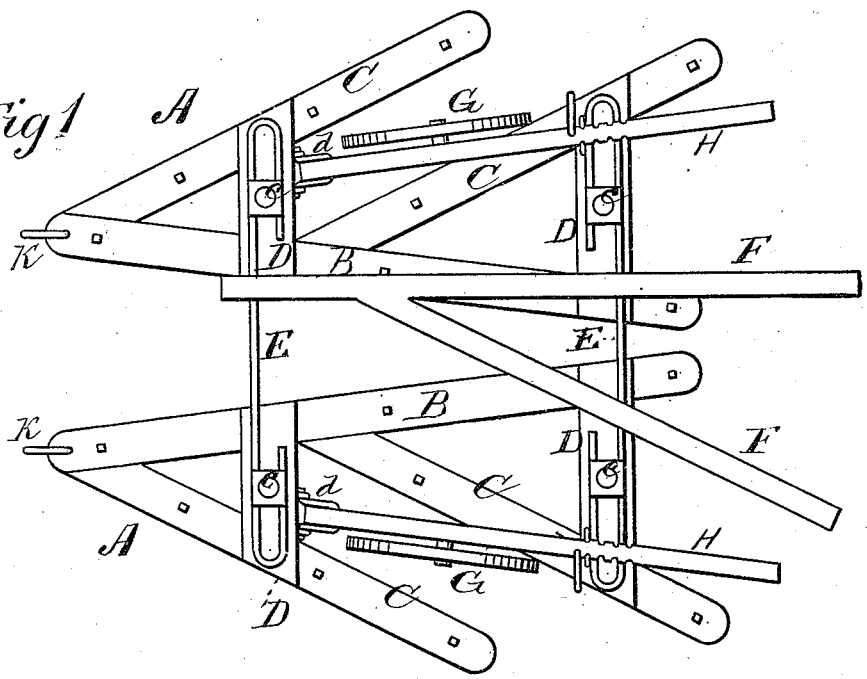
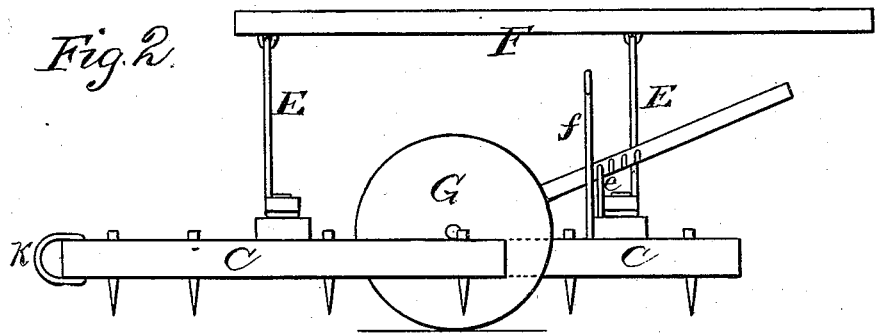
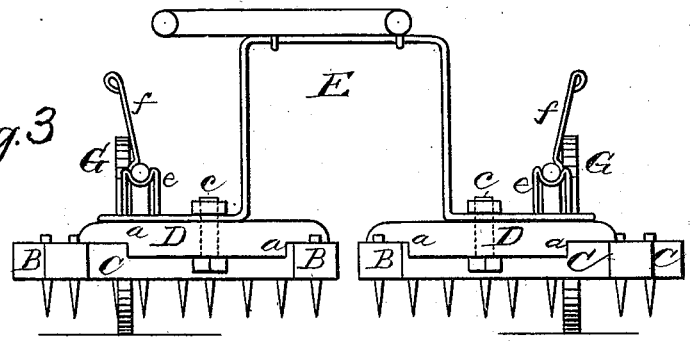
WITNESSES
M. J. Utley
F. J. Masi
INVENTOR
Ahimaas Reagan,
by E. W. Anderson,
ATTORNEY

UNITED STATES PATENT OFFICE.

AHIMAAS REAGAN, OF SALISBURY, MISSOURI.

IMPROVEMENT IN HARROWS.

Specification forming part of Letters Patent No. 193,778, dated July 31, 1877; application filed May 12, 1877.

*To all whom it may concern:*

Be it known that I, AHIMAAS REAGAN, of Salisbury, in the county of Chariton and State of Missouri, have invented a new and valuable Improvement in Harrows; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top view of my harrow. Fig. 2 is a side view thereof, and Fig. 3 is an end view of the same.

This invention has relation to harrows to be used chiefly in the cultivation of corn; and it consists in the construction and novel arrangement of the diverging inside beams and oblique parallel outside beams of the sections, the cross-bars and adjustable couplings, and the wheels journaled to levers adapted to be depressed or raised to bring said wheels into operation, or lift them from the ground, according to requirement, as hereinafter fully shown and described.

In the accompanying drawings, the letters A A designate the two sections of the harrow, each of which consists of an inside or central beam, B, and two or more parallel exterior side beams, C, connected thereto and extending obliquely outward to the rear.

The inside longitudinal or main beams B diverge from each other from rear to front, so that there is more distance between their front teeth than between those with which their rear ends are provided.

The driver is therefore enabled to watch these teeth and guide them with certainty so as to avoid injuring the plants.

Each side beam C is connected to the main beam B by means of a cross-tie, D, which is cut away on its under surface at each end, forming shoulders $a$, which abut against said beams and brace them in position.

E represents the couplings, which may be made of iron or other suitable material. They are usually arched high enough in the center, as shown, to avoid breaking the young corn. Their ends are slotted or provided with reverse bends for the passage of the clamp-bolts $c$, which extend through the brace-ties D, and serve to fix the adjustment of the harrow-sections.

F represents the guiding-handles, which may be connected to the arches of the couplings, as shown.

G indicates the wheels, whereby the harrow is supported in turning corners or in transportation from or to the field. These wheels are journaled to levers H, the free ends of which extend to the rear within convenient distance of the operator. The front ends of these levers are engaged with stirrups $d$, which are pivoted in suitable bearings on the front tie-braces, so that they will swing upward or downward.

The length of these stirrups is sufficient to raise the wheels entirely above the ground when thrown upward and when pressed downward to carry the wheels lower than the teeth, so that the latter will be lifted with the body of the harrow, in which position it may be easily turned or transported. Either adjustment is made secure by means of rests $e$ and keepers $f$ attached to the rear tie-braces.

Clevis-loops K are attached to the front ends of each section, so that each horse can be attached separately to his half of the harrow. The diverging of the beams B will give sufficient play to the single-trees so that there will be sufficient space between them at their inside ends to allow for the corn.

What I claim as new, and desire to secure by Letters Patent, is—

The combination, with a harrow, of the swinging stirrups $d$, attached to braces D, and the wheel-bearing levers H, substantially as specified.

In testimony that I claim the above I have hereunto subscribed my name in presence of two witnesses.

AHIMAAS REAGAN.

Witnesses:
J. MOORHEAD,
E. M. WILLIAMS.